INVENTORS
MARK HASTEN
JOHN T. HAUB
BY *Robert B. Hughes*

ATTORNEY

United States Patent Office 3,321,146
Patented May 23, 1967

3,321,146
FOOD PROCESSING APPARATUS AND PROCESS
Mark Hasten and John T. Haub, both of Minneapolis, Minn., assignors to General Mills, Inc., a corporation of Delaware
Filed Jan. 2, 1964, Ser. No. 335,223
12 Claims. (Cl. 242—47.13)

This invention relates to a method and apparatus for processing a material, particularly a food material such as cooked dough, which is in an elongate or "rope-like" form.

The apparatus of the present invention was designed for use in a process such as that described in U.S. Patent No. 2,858,219. In this process, cooked dough is extruded into a "rope", which is then tempered for a period of time, (i.e. exposed to air at a certain temperature and humidity for perhaps a half-hour or an hour) after which it is then cut into small wafers that are further processed to become finished breakfast cereal flakes. When it is attempted to practice this on a high production commercial scale, it becomes evident that the amount of elongate dough which at any one time is going through this tempering step of the process, may reach out to a considerable length. Obviously, this creates problems in handling this dough so as not to deform it, and yet to provide for its exposure to the surrounding atmosphere, and in then feeding the dough into apparatus for subsequent processing (which in the process of the aforementioned U.S. patent is a slicing operation). If the process is to be continuous, the problems are intensified in that a considerable length of dough must in some manner be continuously conveyed. The prior art attempts to accomplish this, such as having a number of conveyor belts and intermediate guides to move the dough rope from one conveyor to the next, can best be described as cumbrous, requiring a good deal of plant space and equipment, and requiring a certain amount of attention to keep the operation going properly.

Accordingly, it is an object of the present invention to provide an improved process and apparatus for processing a product such as that described above, which process and apparatus can very advantageously be used in a commercial operation.

More particularly it is an object to provide such a process and apparatus which is especially advantageous with respect to various considerations which are of importance in a commercial operation, such as economy of operation and of initial investment of equipment, requiring a small amount of operating area, ease and reliability of operation, ability to properly expose the food material to the surrounding atmosphere, operating so that there is little possibility of contaminating the food product, etc.

It may be stated as an another object of the present invention to provide a process and apparatus whereby what is normally considered to be a cumbrous and problematic processing step of handling a large quantity of rope-like food material in a manner to expose it to specific processing conditions, can be accomplished in a small area, with simple apparatus, and with relative ease.

These and other objects and features of the invention will be more readily understood and appreciated from the following detailed description of the preferred embodiments thereof selected for purposes of illustration and shown in the accompanying drawings, in which:

FIGURE 4 is a perspective view, drawn to an enlarged scale and showing the threaded guide nut which winds the dough rope onto the processing reel.

Figure 1:
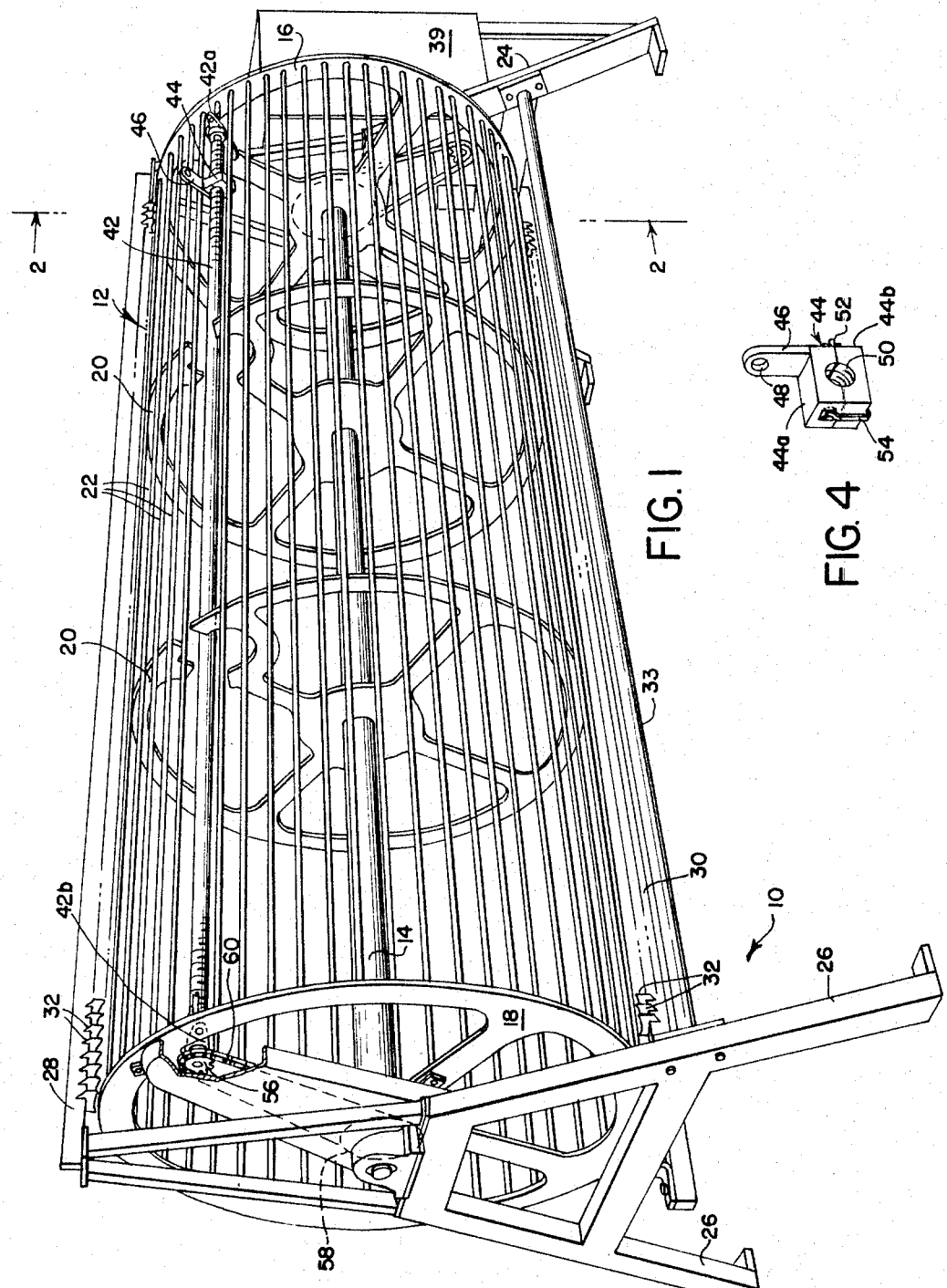
FIGURE 1 is a perspective view of the apparatus of the present invention.
Figure 2:
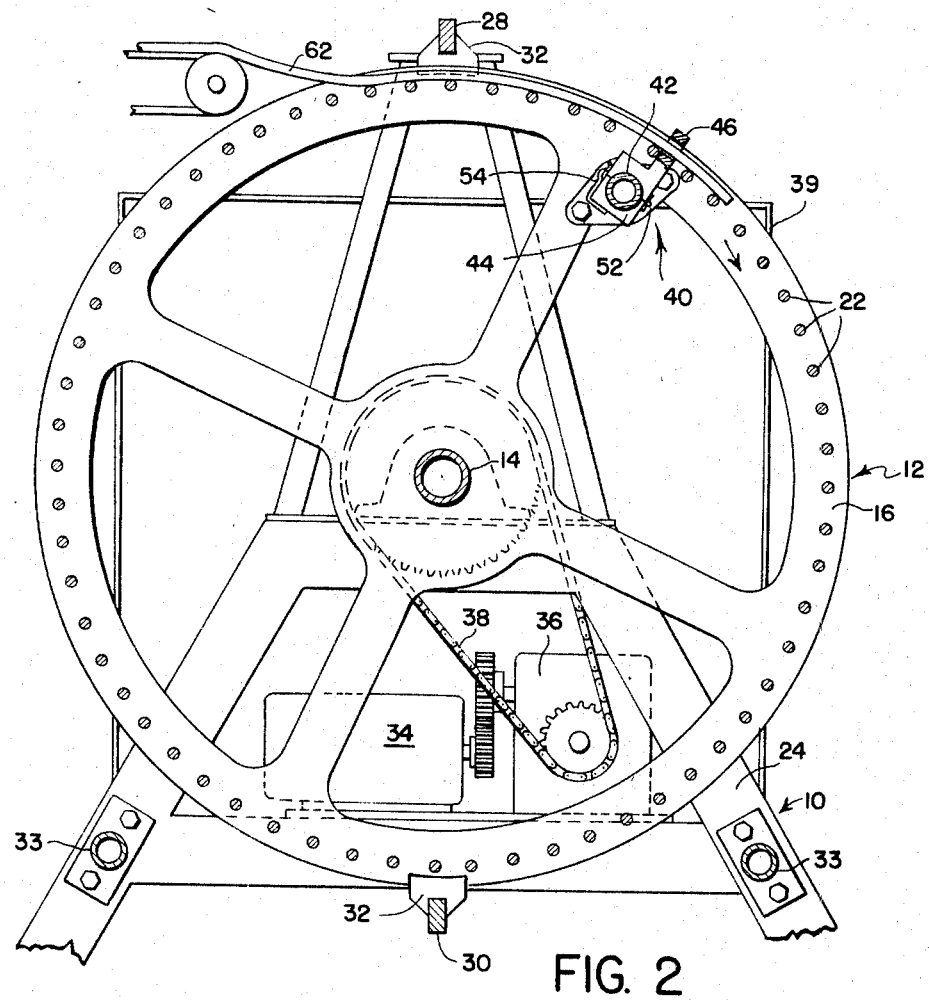
FIGURE 2 is a transverse sectional view taken on line 2—2 of FIGURE 1.

As illustrated in the accompanying drawings, numeral 10 designates a support structure on which a processing reel, generally designated 12, is mounted for rotary motion about a horizontal, longitudinally aligned axis. This reel 12 comprises a center shaft 14 on which is fixedly mounted front and rear circular end frames, or plates, designated 16 and 18 respectively, and two intermediate bracing frames 20. Reaching between the peripheral portions of the front and rear end frames 16 and 18 are a plurality of evenly spaced parallel carrying rods 22, which collectively define the cylindrical configuration of the reel 12. The diameter of each of the rods 22 is small compared to the spacing between each pair thereof so that the reel 12 may be described as a generally cylindrical unit of skeletal construction. As will be disclosed hereinafter, this enables the food material which is wound on the reel 12 to be better exposed to the surrounding atmosphere during the processing time it is so wound on the reel 12.

The mounting structure 10 comprises a front and rear A-frame 24 and 26 in which are journal mounted the front and rear ends, respectively, of the reel shaft 14. Extending longitudinally between the front and rear A-frames 24 and 26 are a top and a bottom lead bar 28 and 30, respectively. Each of the lead bars 28 and 30 has a plurality of fingers or tabs 32 evenly spaced along the length thereof. Each set of tabs 32 projects from its related lead bar toward the reel's outer cylindrical surface which is defined by the rods 22 so as to be adjacent thereto, with each tab being transversely aligned with respect to longitudinal axis of the reel 12. Thus, each proximate pair of tabs 32 defines a guideway by which the food material to be processed is wound onto the reel 12 in successive convolutions. In addition to the lead bars 28 and 30, longitudinal bracing bars 33 are provided between the A-frames 24 and 26.

A motor 34 through a speed reducing transmission 36 and a chain and sprocket drive 38 turns the reel 12 at a moderate speed. This drive assembly 34-38 is provided with a suitable cover, as at 39.

To wind the "rope" of food material onto the reel 12, there is provided a threading mechanism, generally designated 40, which comprises a longitudinally aligned feed screw 42 extending the length of the reel 12 and journal mounted at the front and rear ends thereof at 42a and 42b in, respectively, the front and rear reel end plates 16 and 18. This feed screw 42 is located just inside one side portion of the reel 12 (i.e. adjacent to and positioned interiorly of several of the reel rods 22), and carries thereon a threading nut 44. This nut 44 has a finger 46 reaching through a short distance beyond a pair of rods 22 so that the finger 46 is able to pass between pairs of adjacent guideway tabs 32 but will not strike either of the lead bars 28 and 30. Formed in the finger 46 is a hole 48 into which the front end of a "rope" of food material can be threaded or inserted to begin winding the food material onto the reel 12. So that the threading nut 44 after it has traversed the feed screw 42 can be easily removed and later engage the screw 42 at the front end thereof, the feed nut 44 is separated along a plane dividing diametrically the threaded hole 50 of the nut 44 so as to divide this nut 44 into two pieces 44a and 44b. These two pieces 44a and b are hinged together at 52 on one side and held by a spring loaded clip 54 on the other side.

The threading nut 44 by virtue of the fact that its finger 46 extends through a pair of rods 22, does not rotate with respect to the reel 12, and thus travel of the nut 44 is caused by rotating the feed screw 42. This rotation of the screw 42 is accomplished by fixing a small sprocket 56 to the rear end of the feed screw 42 and fixing a larger sprocket 58 concentrically to the shaft 14. With these two sprockets 56 and 58 interconnected by an endless chain 60, rotation of the reel 12 will cause rotation of the feed screw 42.

By properly selecting the relative sizes of these sprockets 56 and 58 the rate of travel of the threading nut 44 along the screw 42 in relation to rotation of the reel 12 can be positively controlled. These relative rates are such that in one revolution of the reel 12, the threading nut 44 will travel a distance equal to the spacing of two proximate tabs 32 on the lead bars 28 or 30. In this regard, the spacing of the upper and lower tabs 32 is identical, but the upper set of tabs 32 is offset with respect to the lower set a distance equal to one-half the spacing of the tabs. Thus, as the reel 12 revolves, the finger 46 on the threading nut 44 will pass through a slot or guideway defined by a pair of upper tabs 32, then on the next half revolution will pass through a slot defined by a pair of lower tabs 32, and on the succeeding half revolution will pass through the next proximate slot defined by the upper tabs 32. In this manner the finger 46 will define a helical path through each of the slots along the entire length of both lead bars 28 and 30.

Figure 3:
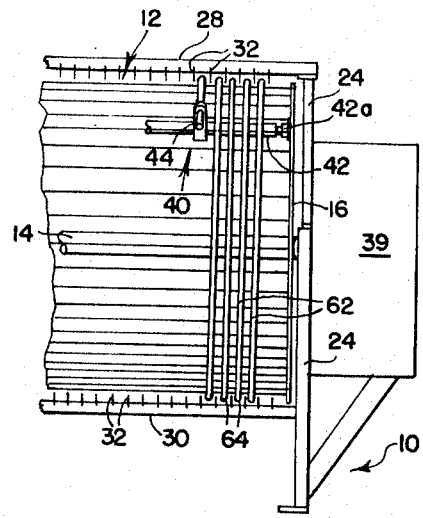
FIGURE 3 is a side elevational view of the front or infeed end of the apparatus of the present invention, with a "rope" of dough material being wound onto the processing reel.

In operation, the front end of the "rope" of food material 62 (e.g. cooked dough) which is to be processed on this reel 12 is inserted into the hole 48 of the finger 46 of the threading nut 44. The motor 34 is either started (or its clutch engaged) so that through the speed reducer 36 and chain and sprocket drive 38 it turns the reel 12. The feed screw 42 and its threading nut 44 rotate with the reel 12, and by virtue of the chain and sprocket drive 56–60 turning the feed screw 42, the nut 44 traverses the feed screw 42 at a predetermined rate with respect to the rotation of the reel 12. The effect of this is that the threading nut 44 describes a helical path as it travels from the front end of the reel 12 to the rear end thereof, with the finger 46 of the nut 44 passing alternately between upper and lower proximate pairs of tabs 32. The result is that the food material 62 is wound onto the outside of the reel 12 in a helical configuration, as shown in FIGURE 3. With each revolution of the reel 12, each convolution 64 of the food material 62 is slid longitudinally rearwardly on the reel 12 through an increment of travel equal to the spacing of the tabs 32. The rotation of the reel 12 causes the various convolutions of the food material to be exposed uniformly to the surrounding atmosphere, and the skeletal construction of the reel 12 permits the exposure of most all of the surface area of the dough material 62.

After the desired number of convolutions 64 of food material 62 has been wound on the reel 12, the front end of the food material 62 is disengaged from the threading nut 46 and fed into the apparatus which performs the next processing operation (which in the aforementioned United States patent is a slicing operation). The threading nut 44 can be removed, or it can be permitted to travel onto a rear unthreaded portion of the screw 42.

Once the desired number of convolutions 64 have been wound onto the reel 12 and the front end of the material 62 is led to the subsequent processing area, this tempering process can proceed continuously without further action of an operator. Any portion of the food material 62 which is wound onto the front end of the reel will, by the time it has reached the end of its travel on the reel 12, have been exposed to the ambient atmosphere for the desired length of time. If the food material 62 is especially fragile, additional guiding means in the form of lead bars, such as those shown at 28 and 30 with the tabs 32, could be provided at other locations adjacent the periphery of the reel 12.

It should be understood that the foregoing is merely illustrative of a certain embodiment of the invention and many variations may be made by those skilled in the art without departing from the spirit and scope of the invention.

Now therefore, we claim:

1. A method for continuously processing an elongate materal comprising:
    (a) continuously feeding said material onto a reel having a longitudinal axis and an infeed end and an outfeed end,
    (b) rotating said reel and helically guiding a lead end of said material about the axis of the reel so that successive convolutions of material are wound onto said reel,
    (c) moving and guiding each convolution longitudinally along said reel axis from the infeed end thereof to the outfeed end thereof as the material is helically wound onto said reel, said convolutions being moved along said reel by a plurality of stationary guide members which define a generally helical guide path about said reel, such guiding of each convolution being accomplished at a point adjacent the periphery of the reel so that each convolution travels longitudinally along said reel, and
    (d) continuously taking off said material from said reel near the outfeed end thereof.

2. The method as recited in claim 1, wherein said material is wound onto said reel by traverse means mounted on said reel, said traverse means having a feed piece to lead said material helically along said guide path.

3. An apparatus for continuously processing an elongate material, said apparatus comprising:
    (a) a mounting structure,
    (b) a material carrying reel having a longitudinal axis and mounted to said structure for rotary motion generally about said axis,
    (c) means to so rotate said reel, and
    (d) guide means attached to the mounting structure proximate the periphery of the reel which define a generally helical guide path for said material about said reel, whereby when material is wound onto said reel along said path, rotation of said reel relative to the guide means will continuously feed material onto said reel to follow said guide path.

4. The apparatus as recited in claim 3, wherein said reel is of skeletal construction and has a generally cylindrical configuration.

5. The apparatus as recited in claim 3 wherein said guide means comprises at least one elongate member positioned so that it is substantially parallel to the reel, and a plurality of stationary guide members longitudinally spaced along said elongate member and positioned in such a manner that they define a plurality of longitudinally spaced, generally transversely aligned slots to receive convolutions of said material therein.

6. The apparatus as recited in claim 5, wherein there are a plurality of sets of said guide members positioned at different locations about the periphery of said reel.

7. The apparatus as recited in claim 6, wherein the axis of said reel is generally horizontally disposed.

8. An apparatus for continuously processing an elongate material, said apparatus comprising:
    (a) a mounting structure,
    (b) a material carrying reel having a longitudinal axis and mounted to said structure for rotary motion generally about said axis,
    (c) means to rotate said reel,
    (d) guide means which define a generally helical guide path for said material about said reel, whereby when material which is wound onto said reel along said path, rotation of said reel will continuously feed said material onto said reel to follow said guide path, and
    (e) a threading device which is mounted on said reel so that it is rotatable therewith, said threading device comprising a traverse piece which travels with said reel and describes a generally helical threading path coinciding with said guide path as said reel rotates.

9. The apparatus as recited in claim 8, wherein said threading device comprises a screw mounted in said reel and a feed nut mounted on said screw, said feed nut traversing said screw as said reel rotates so that said feed nut describes said helical feed path and functions as said traverse piece.

10. The apparatus as recited in claim 9, wherein there is a drive to turn said feed screw so as to cause travel of said feed nut.

11. The apparatus as recited in claim 10, wherein there is a chain and sprocket drive from said apparatus to said feed screw so that rotation of said reel causes a rotation of said feed screw at a predetermined rate with respect to rotation of said reel.

12. In an apparatus for handling an elongate material, said apparatus including a mounting structure, a material carrying reel having a lonigtudinal axis and mounted to said structure for rotary motion generally about said axis, means for rotating said reel, the improved combination comprising a threading device which is mounted on said reel so that it is rotatable therewith, said threading device comprising a traverse piece which travels with said reel and describes a generally helical threading path as said reel rotates.

References Cited by the Examiner

UNITED STATES PATENTS

| | | | |
|---|---|---|---|
| 539,995 | 5/1895 | Nason | 242—158.2 X |
| 1,609,438 | 12/1926 | Stoll | 242—47.13 |
| 1,841,227 | 1/1932 | Van Vlaanderen | 242—47.01 |
| 2,232,500 | 2/1941 | Weaver | 242—47.03 |
| 2,421,750 | 6/1947 | Gannett | 242—47.13 |
| 2,585,948 | 2/1952 | Litzler | 242—47.01 |
| 2,796,169 | 6/1957 | Smith | 242—47.01 |
| 2,819,969 | 1/1958 | Grandel | 99—85 |
| 3,172,765 | 3/1965 | Carloni | 99—85 |

FRANK J. COHEN, *Primary Examiner.*

MERVIN STEIN, N. L. MINTZ, *Assistant Examiners.*